United States Patent
Atmaram et al.

(10) Patent No.: US 8,323,150 B2
(45) Date of Patent: Dec. 4, 2012

(54) QUICK SKIP-AT-SYNC CONTROL SYSTEM AND METHOD

(75) Inventors: Harinath Atmaram, Novi, MI (US);
Matthew D. Whitton, Howell, MI (US);
Robert L. Williams, Holly, MI (US);
Mark A. Schang, Milford, MI (US)

(73) Assignee: GM Global Technology Operations LLC

( * ) Notice: Subject to any disclaimer, the term of this patent is extended or adjusted under 35 U.S.C. 154(b) by 313 days.

(21) Appl. No.: 12/851,672

(22) Filed: Aug. 6, 2010

(65) Prior Publication Data

US 2011/0275479 A1 Nov. 10, 2011

Related U.S. Application Data

(60) Provisional application No. 61/331,090, filed on May 4, 2010.

(51) Int. Cl.
*F16H 59/20* (2006.01)
(52) U.S. Cl. .................................................... 477/133
(58) Field of Classification Search .................. None
See application file for complete search history.

(56) References Cited

U.S. PATENT DOCUMENTS

| | | | | |
|---|---|---|---|---|
| 4,563,917 A | * | 1/1986 | Higashi et al. | 477/133 |
| 4,569,253 A | * | 2/1986 | Higashi et al. | 477/133 |
| 4,955,257 A | * | 9/1990 | Terayama et al. | 477/154 |
| 5,624,351 A | * | 4/1997 | Fujita et al. | 477/148 |
| 5,707,318 A | * | 1/1998 | Shimei et al. | 477/133 |
| 5,863,276 A | * | 1/1999 | Lee | 477/144 |
| 5,924,958 A | * | 7/1999 | Tsuchiya et al. | 477/145 |
| 7,914,417 B2 | * | 3/2011 | Lee | 477/148 |
| 2011/0183809 A1 | * | 7/2011 | Rangaraju et al. | 477/120 |

OTHER PUBLICATIONS

U.S. Appl. No. 12/692,043, filed Jan. 22, 2010, Rangaraju et al.

* cited by examiner

*Primary Examiner* — Dirk Wright

(57) ABSTRACT

A control system includes a shift stage determination module and a clutch control module. The shift stage determination module determines a duration of a first power-on downshift when a second power-on downshift is requested, where a power-on downshift is a downshift of a transmission that occurs when an accelerator pedal is depressed. The clutch control module completes the first power-on downshift and selectively starts controlling the second power-on downshift before the first power-on downshift ends.

20 Claims, 10 Drawing Sheets

QUICK SKIP-AT-SYNC CONTROL SYSTEM AND METHOD

CROSS-REFERENCE TO RELATED APPLICATIONS

This application claims the benefit of U.S. Provisional Application No. 61/331,090, filed on May 4, 2010. The disclosure of the above application is incorporated herein by reference in its entirety.

FIELD

The present disclosure relates to control systems and methods for shifting an automatic transmission that improve shift response time and feel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automatic transmission generally includes a number of gear elements and torque establishing devices such as clutches and brakes. The clutches and brakes are selectively engageable to activate certain gear elements. Gear elements are activated to establish a desired speed or gear ratio between a transmission input shaft and a transmission output shaft.

The transmission input shaft is connected to an engine through a fluid coupling such as a torque converter. The transmission output shaft is connected to vehicle wheels. Shifting from one gear ratio to another may be performed in response to changes in throttle position and vehicle speed.

A shift from one gear element to another may be an upshift (i.e., a shift to a higher gear) or a downshift (i.e., a shift to a lower gear). The shift may be further defined as a power-on shift (i.e., a shift that occurs when an accelerator pedal is depressed) or a power-off shift (i.e., a shift that occurs when an accelerator pedal is released). Power-on shifts (upshifts and downshifts) may require more precise control than power-off shifts, as shifts that occur when a vehicle is accelerating may be more noticeable to a driver.

SUMMARY

A control system includes a shift stage determination module and a clutch control module. The shift stage determination module determines a duration of a first power-on downshift when a second power-on downshift is requested. A power-on downshift is a downshift of a transmission that occurs when an accelerator pedal is depressed. The clutch control module completes the first power-on downshift and selectively starts controlling the second power-on downshift before the first power-on downshift ends.

A method includes determining a duration of a first power-on downshift when a second power-on downshift is requested, completing the first power-on downshift, and selectively starting to control the second power-on downshift before the first power-on downshift ends.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
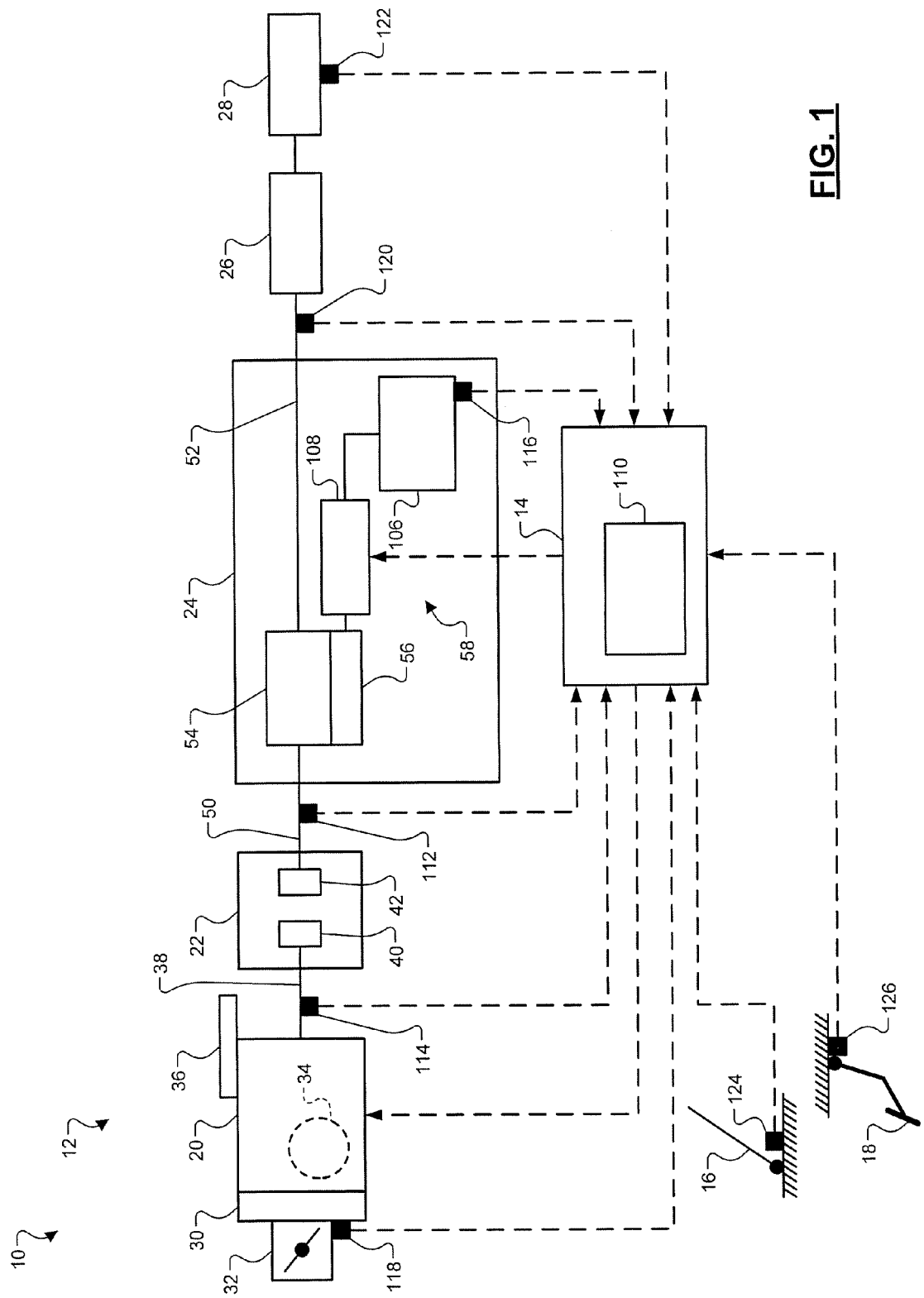
FIG. 1 is a functional block diagram of a vehicle system including a control module according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In a typical automatic transmission, a downshift may be triggered when a driver steps into an accelerator pedal to accelerate the vehicle. If the driver then further depresses the accelerator pedal during the downshift to increase acceleration, a second downshift may be commanded. This second downshift may not be executed until the first downshift is complete. As a result, shift response time may increase and shift feel may worsen.

Consecutive downshifts may also be executed when the driver significantly depresses an accelerator pedal to rapidly accelerate the vehicle. In this instance, a prohibited downshift may be requested such that consecutive downshifts may be executed to satisfy the request. A prohibited downshift is a downshift that involves releasing all applied clutches in a transmission. A prohibited downshift may damage the transmission and is therefore prohibited.

For example, when the driver significantly depresses an accelerator pedal, the driver's actions may be interpreted as a request for a 6-to-3 shift (i.e., a shift from sixth gear to third gear). In some clutch-to-clutch transmissions, a 6-to-3 shift may require releasing both of the applied clutches. Thus, the request may be satisfied with two shifts, a 6-to-5 shift and a 5-to-3 shift.

Control systems and methods have been developed that execute a skip-via-neutral shift when two consecutive downshifts are requested (see, e.g., commonly owned U.S. patent application Ser. No. 12/692,043). A skip-via-neutral shift occurs when a transmission "skips" from a first gear ratio to a second gear ratio via a neutral state. In a skip-via-neutral shift, the first shift is aborted, any holding clutches are released, the transmission is placed in the neutral state, and the clutches for the desired gear ratio of the second shift are applied.

A skip-via-neutral shift may be executed to satisfy request for a prohibited downshift. Under these circumstances, a skip-via-neutral shift does not require aborting a first shift since the consecutive downshifts are requested before the first shift starts. Thus, in a skip-via-neutral shift satisfying a request for a prohibited downshift, any holding clutches are released, the transmission is placed in the neutral state, and the clutches for the desired gear ratio are applied.

Executing a skip-via-neutral shift when acceleration is requested may degrade shift feel. For example, a torque hole may result, causing the driver to perceive that a vehicle is slowing down when acceleration is requested. A torque hole may cause head bobble and a counterintuitive feel.

A control system and method for shifting an automatic transmission according to the present disclosure starts a second downshift before a first downshift ends. The second downshift is started at or before the turbine speed of the first downshift reaches synchronization. In this regard, the second downshift is a skip-at-sync downshift. A skip-at-sync downshift occurs when a transmission "skips" from a first downshift to a second downshift at synchronization of the first downshift. Synchronization occurs when a measured turbine speed is equal to an estimated turbine speed at a commanded gear ratio.

Referring now to FIG. 1, an exemplary vehicle system 10 according to the present disclosure is presented. The vehicle system 10 includes a powertrain 12 controlled by a control module 14. The control module 14 receives inputs from driver interface devices, such as a range selector 16 and an accelerator pedal 18, and from sensors, discussed below, that sense operating conditions of the vehicle system 10. The powertrain 12 includes an engine 20, a torque converter 22, a transmission 24, a driveline 26, and one or more driven wheels 28. The engine 20 produces drive torque that is transmitted through the torque converter 22 to the transmission 24. The transmission 24 transmits the drive torque to the driveline 26 at various gear ratios to drive the wheels 28.

The engine 20 includes an intake system 30 including a throttle 32, one or more cylinders 34, an exhaust system 36, and a crankshaft 38. Air is drawn into the cylinders 34 through the intake system 30 and mixed with fuel, and the resulting air/fuel (A/F) mixture is combusted in the cylinders 34. Combustion of the A/F mixture drives pistons (not shown), which drive rotation of the crankshaft 38 and thereby produce drive torque. The crankshaft 38 is coupled to and drives rotation of the torque converter 22. Exhaust gases produced during combustion are expelled through the exhaust system 36.

The torque converter 22 includes a pump 40, a turbine 42, and a stator (not shown). The pump 40 is drivingly coupled to the crankshaft 38. The turbine 42 is fluidly coupled with the pump 40 and drives rotation of the transmission 24. The stator is disposed between the pump 40 and the turbine 42 and may be used to vary the torque transmitted through the torque converter 22.

The transmission 24 includes an input shaft 50, an output shaft 52, a gear train 54, friction elements 56, and a hydraulic control system 58. The input shaft 50 drivingly couples the turbine 42 with the gear train 54. The output shaft drivingly couples the gear train 54 and the driveline 26. The gear train 54 transmits torque from the input shaft 50 to the output shaft 52 at one or more gear ratios.

Figure 2:
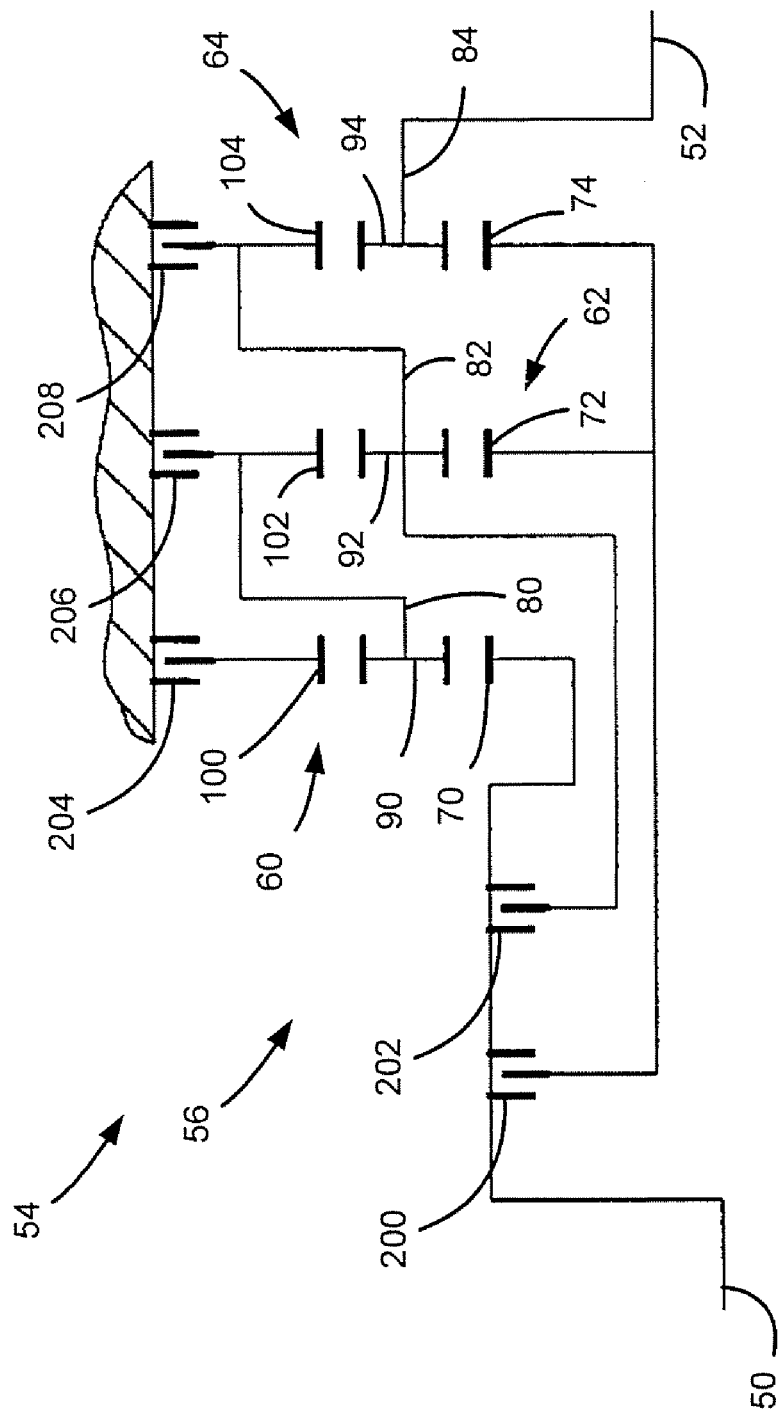
FIG. 2 is a partial schematic of a transmission shown in FIG. 1.

Referring now to FIG. 2, an example of the gear train 54 includes three inter-connected planetary gear sets 60, 62, 64. The planetary gear sets 60, 62, 64 include respective sun gears 70, 72, 74, carriers 80, 82, 84, planetary gears 90, 92, 94, and ring gears 100, 102, 104. The friction elements 56 include clutches 200, 202, 204, 206, 208 that are selectively engageable to establish a desired gear ratio of the transmission 24. For simplicity, the friction elements 56 will be referred to below and in the figures as the clutches 56.

In the present example, the input shaft 50 continuously drives the sun gear 70 of the gear set 60. The input shaft 50 selectively drives the sun gears 72, 74 of the gear sets 62, 64 via the clutch 200 and selectively drives the carrier 82 of the gear set 62 via the clutch 202. The ring gears 100, 102, 104 are selectively grounded via clutches 204, 206, and 208, respectively. The clutches 56 are selectively engaged to provide six forward gear ratios (1, 2, 3, 4, 5, 6), a reverse gear ratio (R), and a neutral mode (N). The table below summarizes the engagement state of the clutches 56 for each gear ratio and for the neutral mode.

|   | 200 | 202 | 204 | 206 | 208 |
|---|-----|-----|-----|-----|-----|
| 1 | X   |     |     |     | X   |
| 2 | X   |     |     | X   |     |
| 3 | X   |     | X   |     |     |
| 4 | X   | X   |     |     |     |
| 5 |     | X   | X   |     |     |
| 6 |     | X   |     | X   |     |
| R |     |     | X   |     | X   |
| N |     |     |     |     | X   |

In the above table, an "X" indicates that the clutch in that column is engaged for the gear ratio in that row. Shifting from one gear ratio to another is achieved by disengaging one or more engaged clutches, referred to as off-going clutches, while engaging one or more disengaged clutches, referred to as on-coming clutches. For example, the transmission 24 may be downshifted from sixth gear to fifth gear by disengaging clutch 206 while engaging clutch 208. In this example, clutch 206 is the off-going clutch and clutch 208 is the on-coming clutch.

Referring again to FIG. 1, the hydraulic control system 58 controls various components of the transmission 24, including the gear train 54. For purposes of the present disclosure, the hydraulic control system 58 controls operation of the clutches 56 and includes a hydraulic pressure source 106 and a hydraulic circuit 108. The hydraulic pressure source 106 supplies hydraulic fluid at a first pressure to the hydraulic circuit 108. The first pressure supplied to the hydraulic circuit 108 may be referred to as line pressure.

The hydraulic circuit 108 selectively supplies the hydraulic fluid to the clutches 56 at second pressures based on pressure commands received from the control module 14. The second pressures may be referred to as clutch control pressures. Although not shown, the hydraulic circuit 108 may include electromechanical actuators, such as solenoids, and hydraulic elements, such as poppet valves and check valves, for controlling the clutch control pressures. The hydraulic circuit 108 controls the clutch control pressures by selectively supplying fluid to or discharging fluid from apply chambers of the clutches 56.

The control module 14 controls operation of the engine 20 and the transmission 24 based on driver inputs received from the range selector 16 and the accelerator pedal 18. The range selector 16 is used by a driver to convey a desired range or gear ratio of the transmission 24. The accelerator pedal 18 is used by the driver to convey a desired acceleration. The control module 14 also controls operation based on vehicle inputs received from various sensors that sense one or more operating conditions of the vehicle system 10.

The control module 14 includes a shift control module 110 that controls clutch control pressures for off-going and on-coming clutches during power-on downshifts (i.e., downshifts that occur when the accelerator pedal 18 is depressed). The shift control module 110 controls the clutch control pressures by outputting timed control signals to the hydraulic circuit 108 indicating desired clutch control pressures. As discussed in more detail below, the shift control module 110 controls the clutch control pressures based on operating conditions. The operating conditions may include turbine speed, compensated input torque, transmission temperature, ambient pressure, gear slip, and vehicle speed.

Turbine speed is a rotational speed of the turbine 42. The turbine speed may be determined using various methods. As one example, turbine speed may be determined based on a rotational speed of the input shaft 50. A transmission input shaft speed (TISS) sensor 112 may measure the rotational speed of the input shaft 50.

Compensated input torque is an estimate of the actual input torque transmitted to the input shaft 50. The compensated input torque accounts for inertial effects associated with the engine 20 and the torque converter 22, as well as torque multiplication by the torque converter 22. Thus, the compensated input torque may be based on an estimated engine output torque, an engine speed, and a torque converter multiplication ratio. The engine speed may be determined based on a rotational speed of the crankshaft 38. A crankshaft speed sensor 114 may sense the rotational speed of the crankshaft 38.

Transmission temperature is an estimate of the temperature of the fluid within the apply chambers of the clutches. The transmission temperature may be determined using various methods. As one example, the transmission temperature may be determined based on a temperature of the fluid supplied by the hydraulic pressure source 106. A transmission fluid temperature sensor 116 may sense the temperature of the fluid.

Ambient air pressure is the absolute pressure of the ambient air. The ambient pressure may be measured directly by a sensor that senses the ambient pressure. Alternately, the ambient pressure may be estimated based on one or more measured engine operating conditions, including a mass air flow (MAF), a manifold air pressure (MAP), and a throttle position. The MAF, the MAP, and the throttle position may be sensed by one or more sensors located in the intake system 30. For purposes of the present disclosure, only a throttle position sensor 118 that measures a position of the throttle 32 is shown.

Gear slip is a difference between an estimated output shaft speed and a measured output shaft speed. Gear slip may also be a difference between an estimated turbine speed at a commanded gear ratio and a measured turbine speed. Positive gear slip occurs when the measured turbine speed is greater than the estimated turbine speed. The estimated turbine speed at the commanded gear ratio may be calculated by multiplying a rotational speed of the output shaft 52 by the commanded gear ratio. A transmission output shaft speed (TOSS) sensor 120 may measure the rotational speed of the output shaft 52.

Vehicle speed is the linear speed of the vehicle system 10. The vehicle speed may be determined based on a rotational speed of the wheels 28. A wheel speed sensor 122 may measure the rotational speed of the wheels 28.

The shift control module 110 also controls the clutch control pressures based on a selector position sensor 124 and a pedal position sensor 126. The selector position sensor 124 senses the position of the range selector 16. The pedal position sensor 126 senses the position of the accelerator pedal 18. The shift control module 110 also controls engine output torque based on the inputs received from the sensors 112, 114, 116, 118, 120, 122, 124, and 126.

The shift control module 110 may execute a power-on downshift when the pedal position sensor 126 indicates that the driver has stepped into the accelerator pedal 18. The shift control module 110 may start a first power-on downshift when the driver initially steps into the accelerator pedal 18, and may start a second power-on downshift when the driver steps further into the accelerator pedal 18. When this occurs, the shift control module 110 starts the second power-on downshift before the first power-on downshift ends.

The shift control module 110 starts the second power-on downshift at or before synchronization of the first power-on downshift. Synchronization of the first power-on downshift occurs when the measured turbine speed is equal to the estimated turbine speed at the commanded gear ratio of the first power-on downshift. In this manner, the shift control module 110 executes a skip-at-sync downshift.

Figure 3:
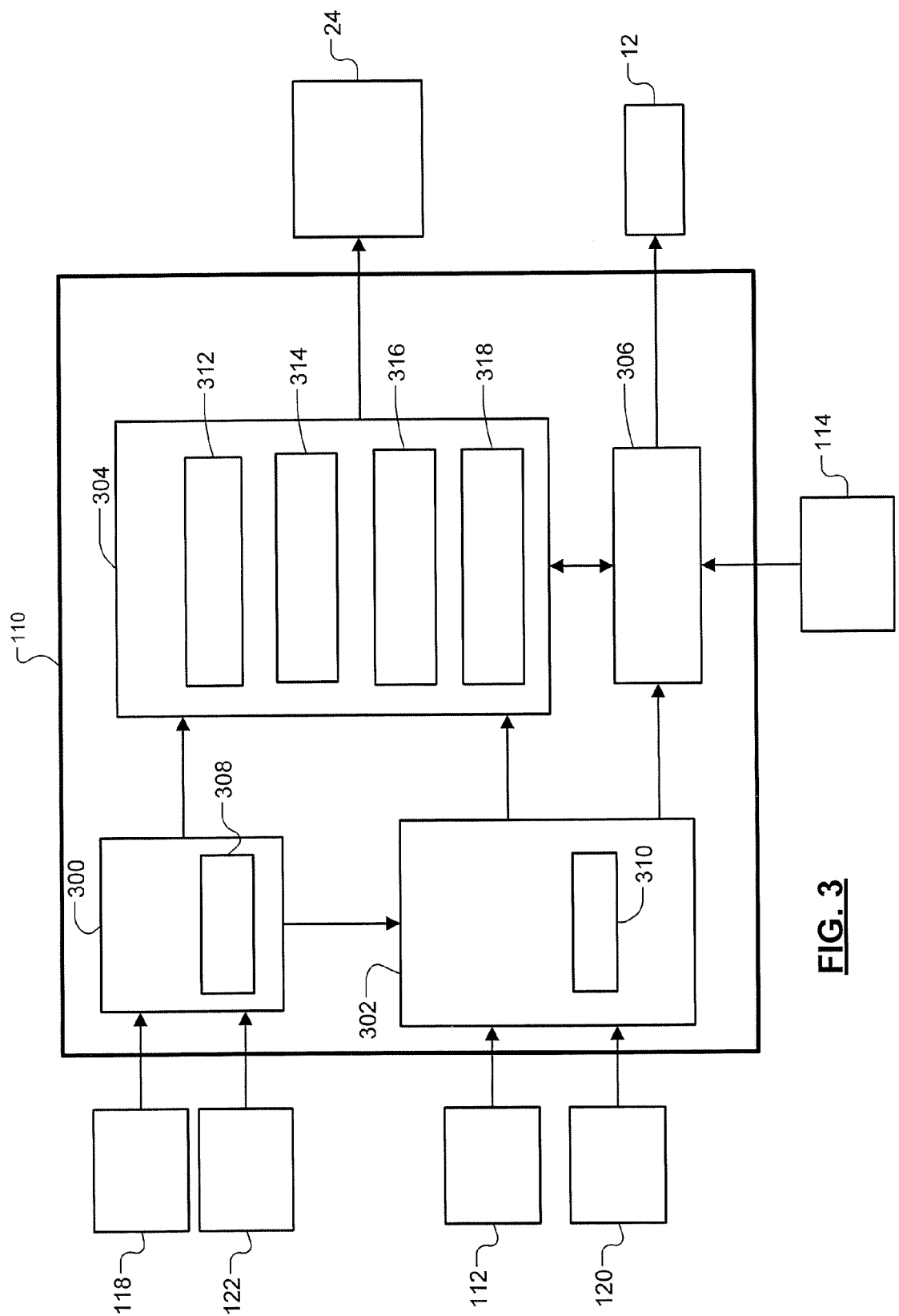
FIG. 3 is a functional block diagram of the control module of FIG. 1.

Referring now to FIG. 3, the shift control module 110 includes a shift type determination module 300, a shift stage determination module 302, a clutch control module 304, and an engine torque control module 306. The shift type determination module 300 communicates with the sensors 118, 122 and determines a shift type based on the throttle position and the vehicle speed. The shift type determination module 300 includes a shift schedule 308 that relates the throttle position and the vehicle speed to a gear ratio.

A gear ratio is a ratio of a transmission input shaft speed over a transmission output shaft speed. A desired gear ratio may be determined based on a current throttle position, a current vehicle speed, and the shift schedule 308. A gear shift is commanded when the commanded (i.e., desired) gear ratio is different from an attained (i.e., current) gear ratio. The shift type may be determined based on the attained gear ratio, the commanded gear ratio, the throttle position, and the vehicle speed.

For example, a downshift may be executed when the commanded gear ratio is greater than the attained gear ratio. The downshift may be a power-on downshift or a power-off downshift. A power-on downshift may occur when the accelerator pedal 18 is depressed and the throttle 32 is opened for acceleration. A power-off downshift may occur when the accelerator pedal 18 is released and the vehicle is coasting and decelerating. For example, coasting down from 40 miles per hour (MPH) to 35 MPH may cause a power-off downshift (i.e., closed throttle downshift) from sixth gear to fifth gear (i.e., a six-to-five shift).

An upshift may be executed when the commanded gear ratio is less than the attained gear ratio. The upshift may be a power-on upshift or a power-off upshift. A power-on upshift may be executed when the accelerator pedal 18 has been depressed, the throttle 32 has been opened, and the vehicle speed has been increased after the accelerator pedal 18 was depressed. A power-off upshift may occur when the accelerator pedal 18 is released after the vehicle speed has been increased.

The shift stage determination module 302 includes a timer 310 that is activated when a shift is initiated. The shift stage determination module 302 determines the stage of the shift based on the duration of the shift measured by the timer 310 and/or the turbine speed detected by the TISS sensor 112.

The clutch control module 304 may include a number of clutch transition modules that correspond to different shift types. For example, the clutch control module 304 may include a power-off upshift module 312, a power-on upshift module 314, a power-off downshift module 316, and a power-on downshift module 318. The clutch control module 304 selects a clutch transition module based on the shift type determined by the shift type determination module 300. The selected clutch transition module controls the transmission 24 to execute a shift. The manner in which the selected clutch transition module executes the shift may depend on the shift stage received from the shift stage determination module 302, as discussed in more detail below.

The clutch control module 304 executes a skip-at-sync downshift when the shift type determination module 300 indicates that a second power-on downshift is requested during execution of a first power-on downshift. The clutch control module 304 also executes a skip-at-sync downshift when a shift request requires releasing and applying two clutches. The clutch control module 304 may execute a skip-at-sync downshift in accordance with the skip-at-sync control method discussed below with reference to FIG. 4. In addition, the clutch control module 304 may execute a skip-at-sync downshift by generating the clutch control signals discussed below with reference to FIGS. 7 through 10.

The engine torque control module 306 communicates with the shift stage determination module 302 and the clutch control module 304. The engine torque control module 306 controls output torque of the engine 20 during a skip-at-sync downshift. The engine torque control module 306 does this by generating the engine control signal discussed below with reference to FIG. 10.

Figure 4:
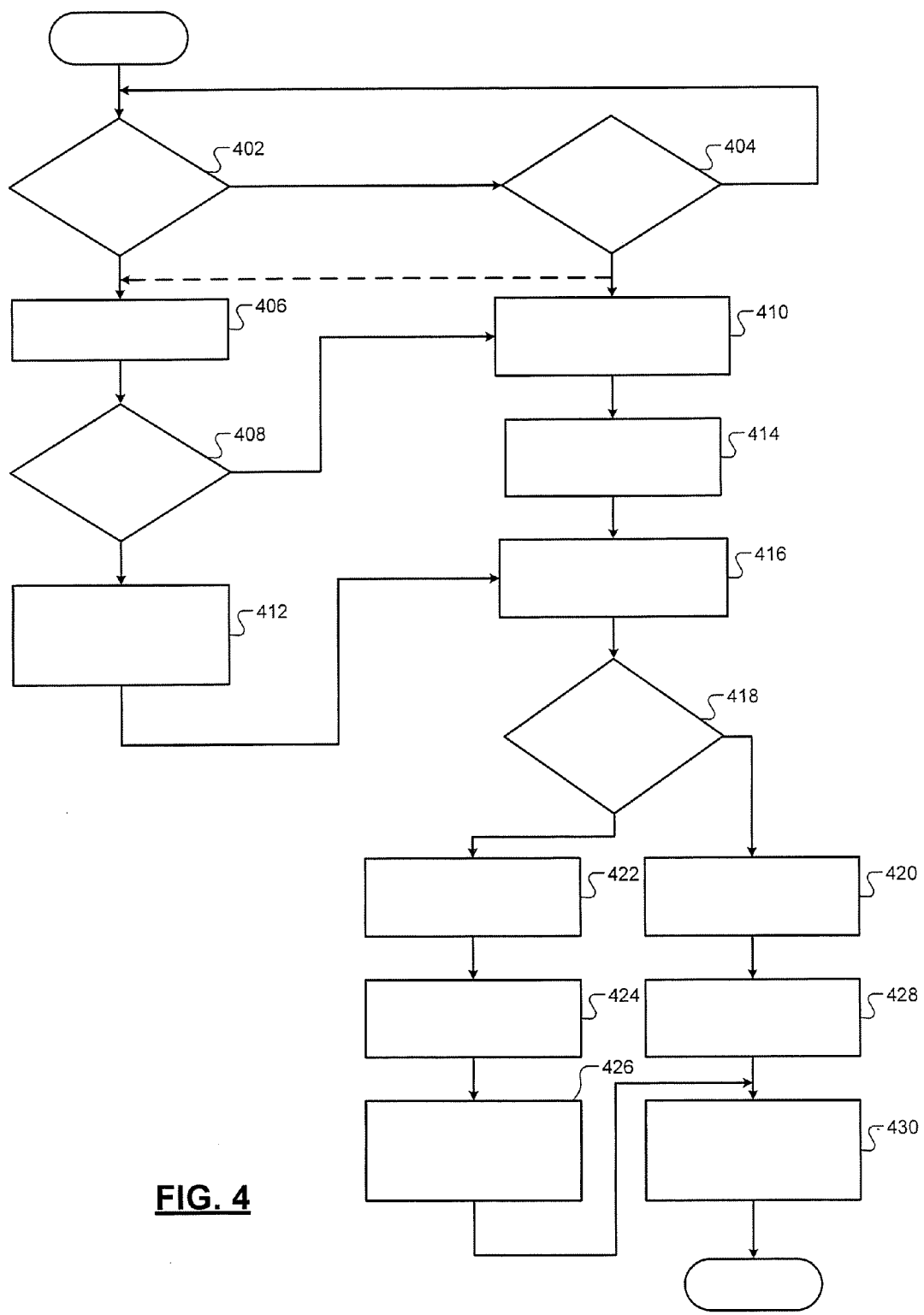
FIG. 4 illustrates a method for shifting an automatic transmission according to the principles of the present disclosure.

Referring now to FIG. 4, a skip-at-sync control method according to principles of the present disclosure is illustrated. At 402, the method determines whether a second shift is requested during a first shift. The method may make this determination based on an attained gear ratio, a commanded gear ratio, a throttle position, a vehicle speed, and a shift schedule. If 402 is false, the method continues at 404; otherwise, the method continues at 406.

At 404, the method determines whether a prohibited shift is requested. The method may determine that a prohibited shift is requested based on a shift type (e.g., six-to-three) and the table discussed above with reference to FIG. 2. If 404 is false, the method returns to 402. Otherwise, the method may determine that a first shift and a second shift are requested when the prohibited shift is requested, and the method may either continue at 410 or continue at 406.

At 406, the method determines a first shift stage at the time of the second shift request. The method may determine the first shift stage based on a measured duration of the first shift, which may be provided by a timer that is activated when the first shift starts. If the first shift and the second shift are executed to satisfy a prohibited shift request, the measured duration is zero because the first shift and the second shift are requested at the same time (i.e., when the prohibited shift is requested). At 408, the method determines whether the first shift stage is late. The method may determine that the first shift stage is late when the measured duration is greater than a predetermined time. If 408 is false, the method continues at 410; otherwise, the method continues at 412.

At 412, the method fully releases a first off-going clutch (i.e., an off-going clutch associated with the first shift) after a first sync time. The first sync time is a time when a measured turbine speed is equal to an estimated turbine speed at a commanded gear ratio of the first shift. Fully releasing the first off-going clutch after the first sync time prevents an undesired increase in vehicle acceleration between the first and second shifts, improving shift feel.

At 410, the method controls the first off-going clutch to prevent a turbine deceleration. The method may achieve this by limiting a control pressure for the first off-going clutch at a predetermined pressure. At 414, the method fully releases the first off-going clutch at or before the first sync time. This causes the measured turbine speed to increase through the first sync time, minimizing shift time including the time between the first and second shifts.

At 416, the method starts applying a second on-coming clutch (i.e., an on-coming clutch associated with the second shift) at or before the first sync time. The method applies the second on-coming clutch by increasing a control pressure for the second on-coming clutch.

At 418, the method determines whether the second shift requires releasing a first holding clutch (i.e., a holding clutch associated with the first shift). The method may determine whether the second shift requires releasing the first holding clutch using the shift type and the above table. If 418 is false, the method continues at 420; otherwise, the method continues at 422.

At 422, the method starts releasing the first holding clutch before the first sync time. The method starts releasing the first holding clutch by decreasing a control pressure for the first holding clutch. Releasing the first holding clutch before the first sync time minimizes shift time.

At 424, the method stages the first holding clutch at the first sync time using a predetermined pressure that prevents clutch slip. The predetermined pressure may be at or slightly above a minimum pressure that prevents slip. Staging the first holding clutch in this manner prevents a release of two clutches at the same time and decreases the time required to fully release the first holding clutch after the first sync time, minimizing shift time.

At 426, the method incrementally applies a first on-coming clutch to optimize shift feel (i.e., an on-coming clutch associated with the first shift). The timing and rate of apply increments may be determined based on a desired shift time and a transmission input torque. If 418 is true, the first on-coming clutch becomes a second holding clutch (i.e., a holding clutch associated with the second shift) when the first shift ends and the second shift begins. At this point, the method applies the second holding clutch in the same manner.

At 420, the method refrains from fully applying the first on-coming clutch. If 418 is false, the first on-coming clutch becomes a second off-going clutch (i.e., an off-going clutch associated with the second shift) when the first shift ends and the second shift begins. Refraining from fully applying the first on-coming clutch decreases the time required to fully release the first on-coming clutch after the first sync time, minimizing shift time.

At 428, the method stages the first on-coming clutch using a predetermined pressure that prevents clutch slip. The predetermined pressure may be at or slightly above a minimum pressure that prevents clutch slip. Staging the first on-coming clutch in this way decreases the time required to fully release the first on-coming clutch after the first sync time, minimizing shift time.

At 430, the method fully releases the second off-going clutch and fully applies the second on-coming clutch. The second shift ends when the second off-going clutch is fully released and the second on-coming clutch is fully applied. At this point, the method may end or the method may return to 402.

Figure 5:
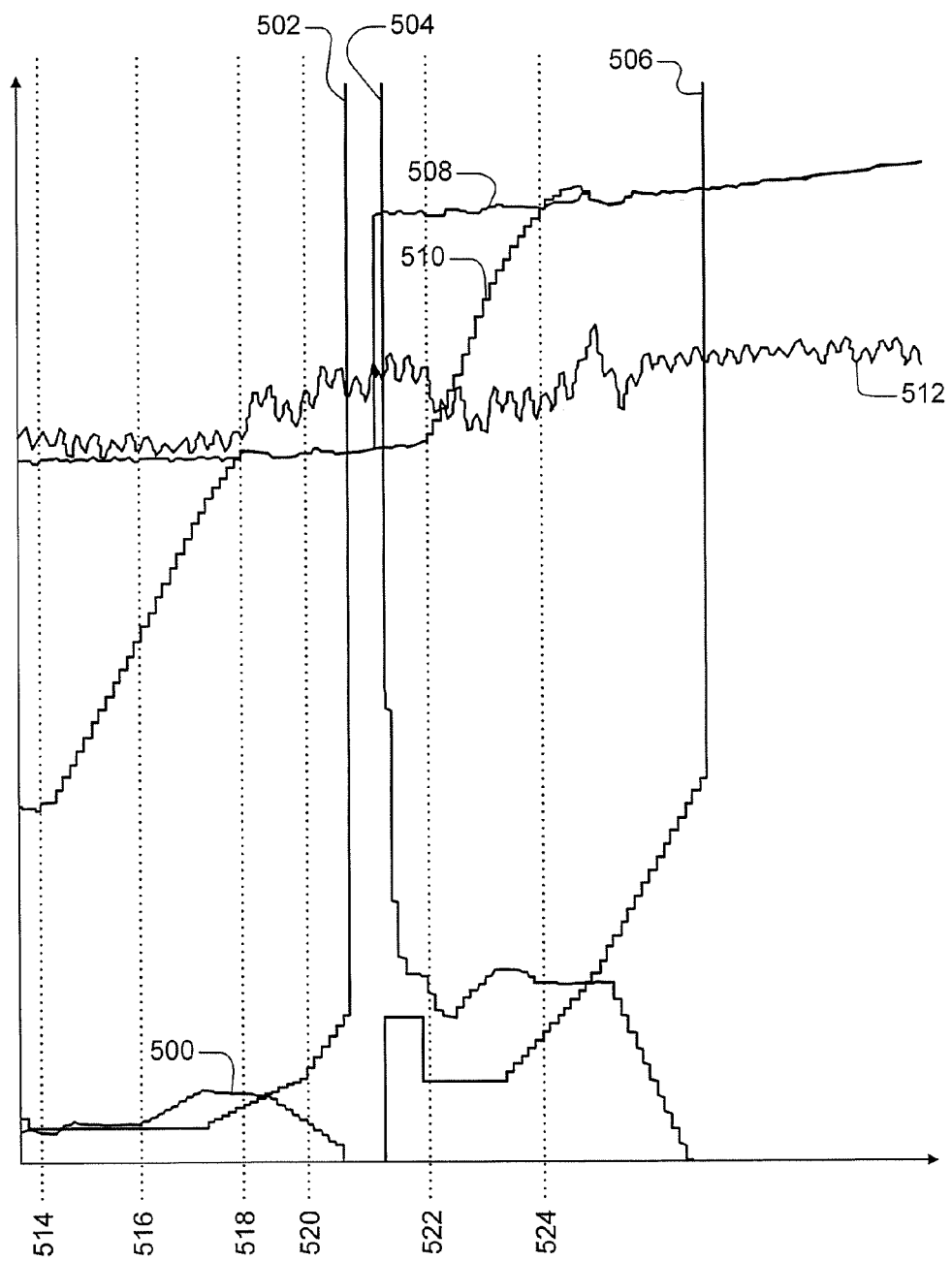
FIGS. 5 and 6 illustrate control signals and sensor signals when shifting an automatic transmission according to the prior art.

Referring now to FIG. 5, conventional clutch control and sensor signals associated with two consecutive power-on downshifts are illustrated. For purposes of the present disclosure, the x-axis represents time and clutch control signals represent commanded clutch control pressures. Clutch control signals 500, 502 control off-going and on-coming clutches, respectively, associated with a first (six-to-four) shift. Clutch control signals 504, 506 control off-going and on-coming clutches, respectively, associated with a second (four-to-three) shift.

A sensor signal 508 indicates an estimated turbine speed, or a transmission output shaft speed multiplied by a commanded gear ratio. A sensor signal 510 indicates a measured turbine speed. A sensor signal 512 indicates vehicle acceleration, or a vehicle speed integrated with respect to time.

Prior to 514, an accelerator pedal position signal (not shown) indicates that the first shift is requested. At 514, the first shift begins as the measured turbine speed starts to increase. At 516, the second shift is requested. At 518, the first shift ends at a first sync time (i.e., time of first shift sync) when the measured turbine speed increases to equal the estimated turbine speed at a commanded gear ratio of the first shift. Between 516 and 520, the off-going clutch control pressure is increased to prevent shift flare. Shift flare occurs when the measured turbine speed overshoots the estimated turbine speed after sync.

After the first sync time and after 520, the first off-going clutch is fully released and the first on-coming clutch is fully applied. After the first on-coming clutch is fully applied and before 522, release of the second off-going clutch is started and application of the second on-coming clutch is started.

At 522, the second shift begins as the measured turbine speed starts to increase. Thus, there is a delay between the first shift and the second shift, increasing the time required for the two shifts. In addition, the vehicle acceleration increases during this delay, causing a driver to perceive two distinct shifts. At 524, the second shift ends as the measured turbine speed increases to the estimated turbine speed at the commanded gear ratio of the second shift.

Figure 6:
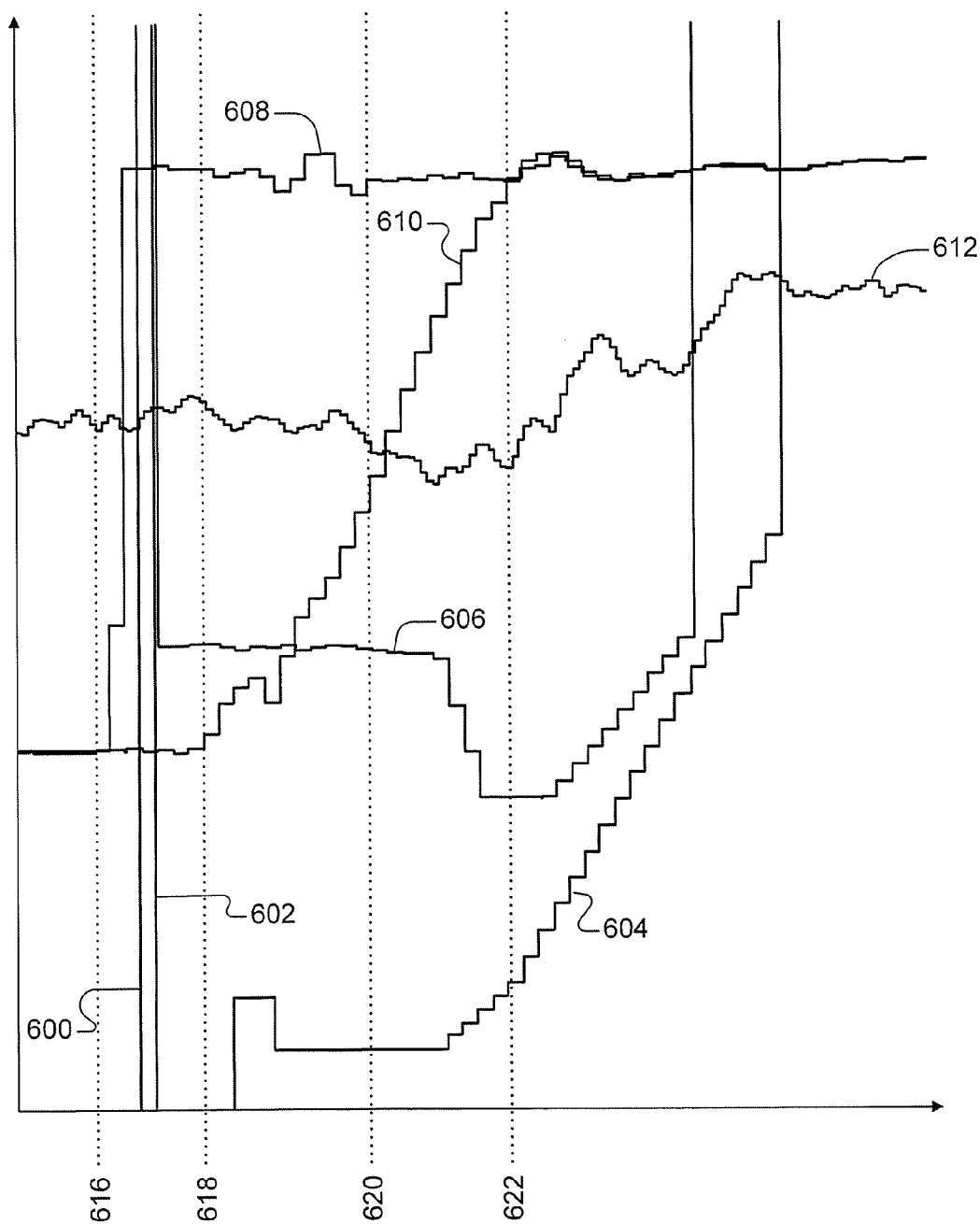

Referring now to FIG. 6, clutch control and sensor signals for a skip-via-neutral shift are illustrated. Clutch control signals 600, 602 control two off-going clutches associated with a first (six-to-three) shift. Clutch control signal 604 controls two on-coming clutches associated with the first shift. An engine control signal 606 controls an engine output torque during the first shift.

As shown in the table discussed above with reference to FIG. 2, a six-to-three shift of a clutch-to-clutch automatic transmission may require releasing two clutches (202, 206) and applying two clutches (200, 204). Thus, a six-to-three shift is typically accomplished with two consecutive downshifts, as shown in FIG. 5. A skip-via-neutral shift enables releasing and applying two clutches in a single shift of a clutch-to-clutch automatic transmission. However, a skip-via-neutral shift may result in a torque hole or an undesired neutral shift feel.

A sensor signal 608 indicates an estimated turbine speed, or a transmission output shaft speed multiplied by a commanded gear ratio. A sensor signal 610 indicates a measured turbine speed. A sensor signal 612 indicates vehicle acceleration, or a vehicle speed integrated with respect to time.

At 616, the first shift is requested. At 618, the first shift begins as the measured turbine speed starts to increase. Between 616 and 618, the engine output torque is decreased to improve shift feel. Between 618 and 620, application of the two on-coming clutches is initiated. Between 620 and 622, the vehicle acceleration decreases, causing a driver to perceive a torque hole. At 622, the first shift is synchronized and the vehicle acceleration starts to increase.

Figure 7:
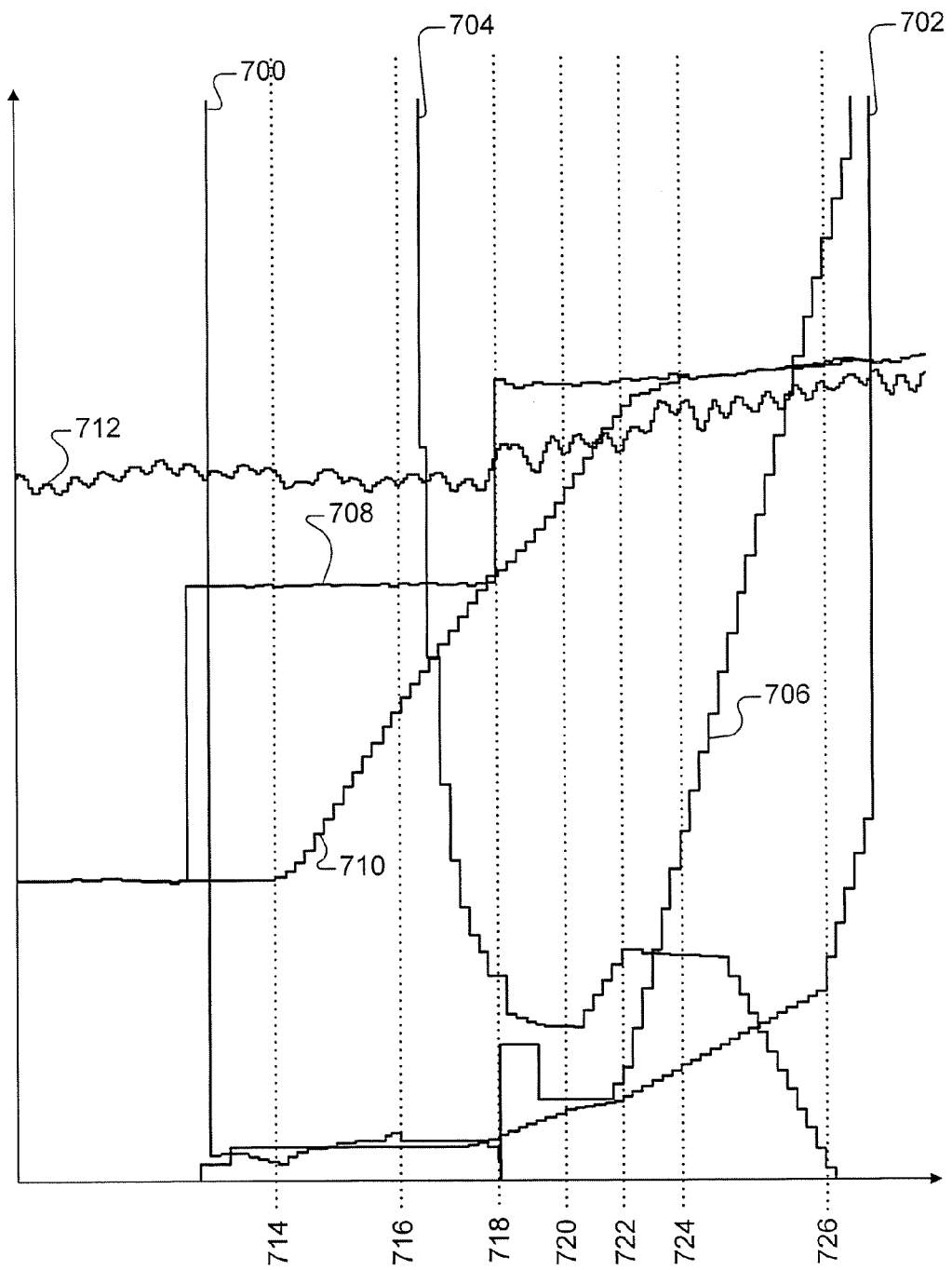
FIGS. 7 through 10 illustrate control signals and sensor signals when shifting an automatic transmission according to the present disclosure.

Referring now to FIG. 7, clutch control and sensor signals for a skip-at-sync shift according to principles of the present disclosure are illustrated. Clutch control signal 700 controls a first off-going clutch of a first (six-to-four) shift. Clutch control signal 702 controls a first on-coming clutch of the first shift that is transformed into a second holding clutch of a second (four-to-three) shift. Clutch control signal 704 controls a first holding clutch of the first shift that is transformed into a second off-going clutch of the second shift. Clutch control signal 706 controls a second on-coming clutch of the second shift.

A sensor signal 708 indicates an estimated turbine speed, or a transmission output shaft speed multiplied by a commanded gear ratio. A sensor signal 710 indicates a measured turbine speed. A sensor signal 712 indicates vehicle acceleration, or a vehicle speed integrated with respect to time.

At 714, the first shift begins as the measured turbine speed starts to increase. At 716, the second shift is requested. Between 716 and 718, rather than increasing the first off-going clutch control pressure to prevent shift flare, this control pressure is limited to prevent a turbine deceleration. At 718, the first shift ends at a first sync time when the measured turbine speed equals the estimated turbine speed at a commanded gear ratio of the first shift.

Also at 718, the second shift begins as the measured turbine speed continues to increase through the first sync time. Thus, there is zero delay between the two shifts. In addition, at 718, the first holding clutch control pressure is staged at or just above a minimum pressure that prevents clutch slip.

At 720 and 722, the second holding clutch control pressure is adjusted to gradually apply the second holding clutch and to achieve an optimum shift feel. The second holding clutch may be applied using timing and rates that are based on a desired shift time and a transmission input torque. At 724, a second sync time occurs when the measured turbine speed increases to the estimated turbine speed at a commanded gear ratio of the second shift. At 726, the second holding clutch control pressure is adjusted as discussed above.

Decreasing the first holding clutch before the first shift ends at the first sync time starts control of the second shift before the first shift ends. Starting control of the second shift before the first shift ends and controlling the first off-going clutch to prevent a turbine deceleration enables the zero delay between the first shift and the second shift. In addition, the vehicle acceleration steadily increases during the first shift and the second shift, causing the driver to perceive the two shifts as one shift with no torque hole.

In contrast to the two consecutive downshifts depicted in FIG. 5, there is zero delay between the first shift and the second shift, and the vehicle acceleration steadily increases rather than temporarily increasing between shifts. In contrast to the skip-via-neutral shift depicted in FIG. 6, the vehicle acceleration steadily increases rather than temporarily decreasing while shifting is performed. Eliminating the delay between shifts causes the driver to perceive the two shifts as one shift, and avoiding a temporary decrease in the vehicle acceleration prevents the driver from perceiving a torque hole.

Figure 8:
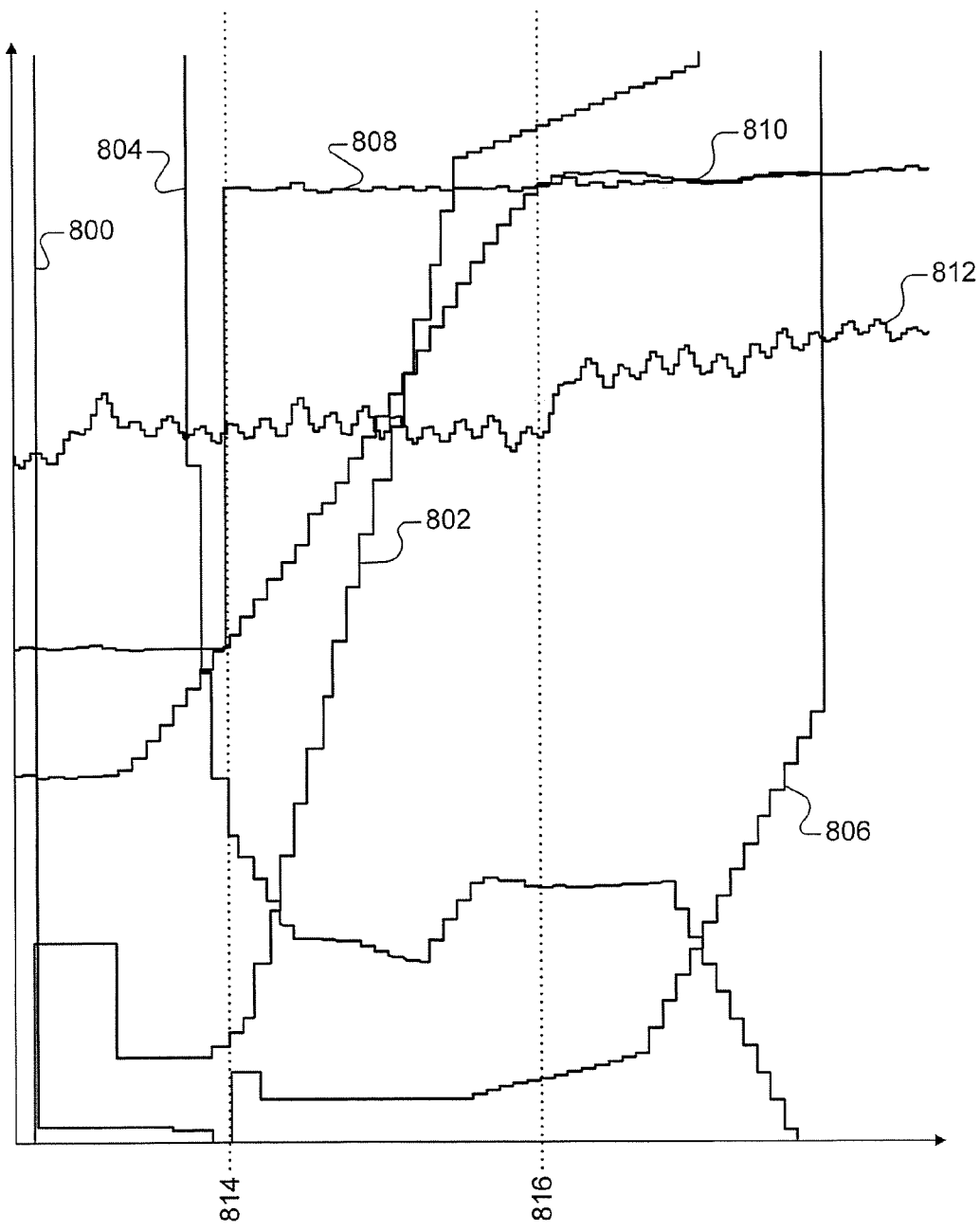

Referring now to FIG. 8, clutch control and sensor signals for a skip-at-sync shift according to principles of the present disclosure are illustrated. In FIGS. 5 and 7, a second shift is requested while a first shift is still in progress. In FIGS. 6 and 8, a driver greatly depresses an accelerator pedal prior to shifting, which is interpreted as a request for a prohibited (six-to-three) shift. While the clutch control signals of FIG. 6 satisfy this request with a skip-via-neutral shift, the clutch control signals of FIG. 8 satisfy this request with a skip-at-sync shift.

Clutch control signal 800 controls a first off-going clutch of a first (six-to-five) shift. Clutch control signal 802 controls a first on-coming clutch of the first shift that is transformed into a second holding clutch of a second (five-to-three) shift. Clutch control signal 804 controls a first holding clutch of the first shift that is transformed into a second off-going clutch of the second shift. Clutch control signal 806 controls a second on-coming clutch of the second shift.

A sensor signal 808 indicates an estimated turbine speed, or a transmission output shaft speed multiplied by a commanded gear ratio. A sensor signal 810 indicates a measured turbine speed. A sensor signal 812 indicates vehicle acceleration, or a vehicle speed integrated with respect to time.

Prior to 814, the first shift and the second shift are requested. When this occurs, the first off-going clutch is fully released to minimize shift time. At 814, the first shift begins as the measured turbine speed starts to increase. At 816, the first shift ends at a first sync time when the measured turbine speed is equal to the estimated turbine speed at a commanded gear ratio of the first shift.

Also at 814, the second shift begins as the measured turbine speed continues to increase after the first sync time, resulting in zero delay between shifts. At 816, a second sync time occurs when the measured turbine speed reaches the estimated turbine speed at a commanded gear ratio of the second shift. Between 814 and 816, the second holding clutch control pressure is increased using a steep rise rate. The second holding clutch may be applied using the steep rise rate to improve shift feel. Applying the second holding clutch using the steep rise rate may improve shift feel by simplifying shift control and thereby reducing shift variability. Once the second holding clutch is applied, the turbine speed may be solely controlled via release of the second off-going clutch.

Figure 9:
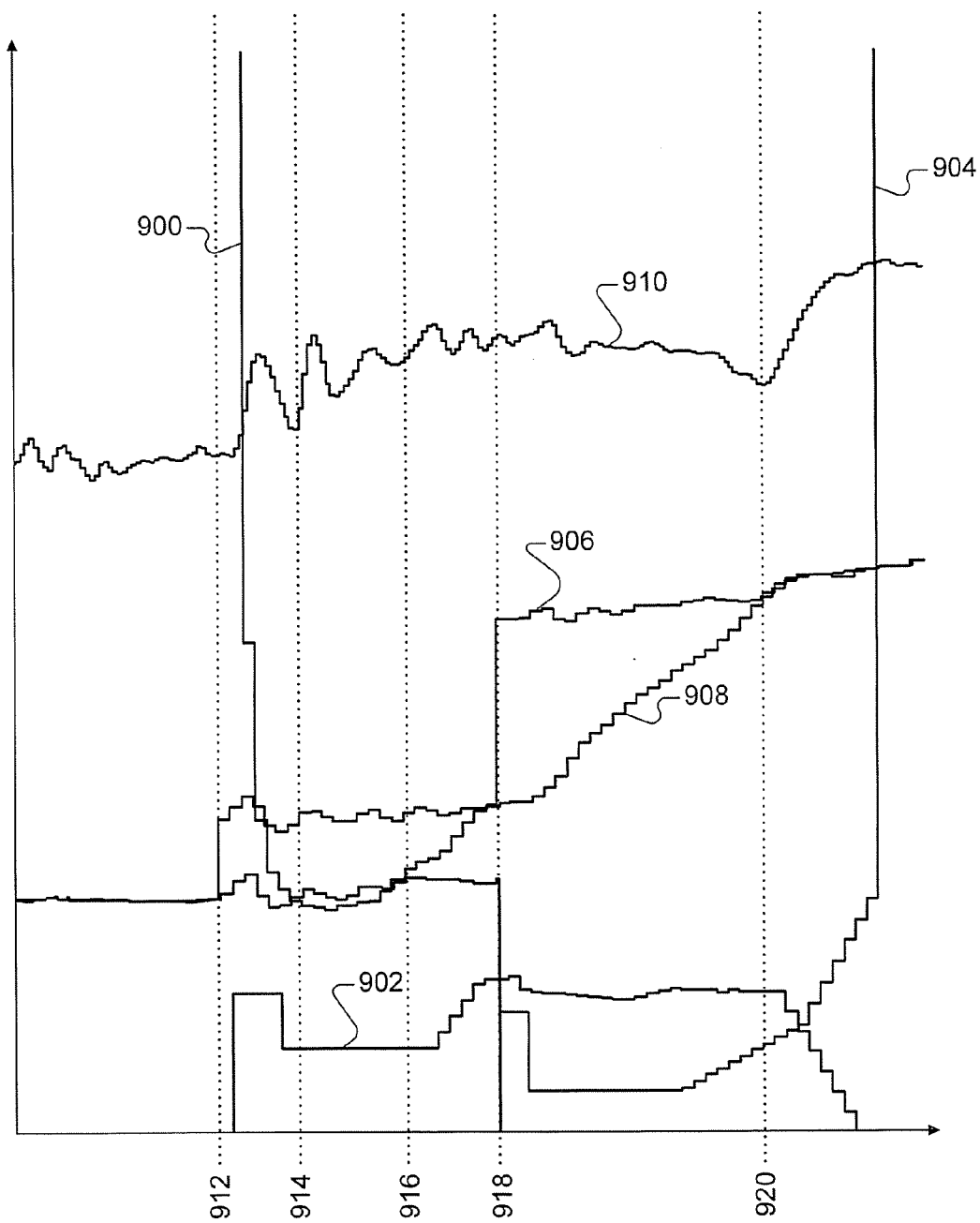

Referring now to FIG. 9, clutch control and sensor signals for a skip-at-sync shift according to principles of the present disclosure are illustrated. Either the first holding clutch or the first on-coming clutch may be transformed into the second off-going clutch based on a transmission design and a shift type. In FIG. 8, the first holding clutch is transformed into the second off-going clutch. In FIG. 9, the first on-coming clutch is transformed into the second off-going clutch.

Clutch control signal 900 controls a first off-going clutch of a first (six-to-five) shift. Clutch control signal 902 controls a first on-coming clutch of the first shift that is transformed into a second off-going clutch of a second (five-to-four) shift. Clutch control signal 904 controls a second off-going clutch of the second shift. In view of the discussion of FIG. 2 above, one holding clutch (202) may be applied for both shifts using a constant clutch control signal (not shown).

A sensor signal 906 indicates an estimated turbine speed, or a transmission output shaft speed multiplied by a commanded gear ratio. A sensor signal 908 indicates a measured turbine speed. A sensor signal 910 indicates vehicle acceleration, or a vehicle speed integrated with respect to time.

At 912, the first shift is requested. At 914, the second shift is requested. Between 916 and 918, the first off-going clutch is controlled to prevent a turbine deceleration. At 918, the first shift ends at a first sync time when the measured turbine speed is equal to the measured turbine speed at a commanded gear ratio of the first shift.

Also at 918, the first oncoming clutch is controlled at or just above a minimum pressure that prevents clutch slip. In addition, at 918, the first off-going clutch is fully released and apply of the second on-coming clutch is started. At 920, the second shift ends as the measured turbine speed increases to the measured turbine speed at a commanded gear ratio of the second shift.

Figure 10:
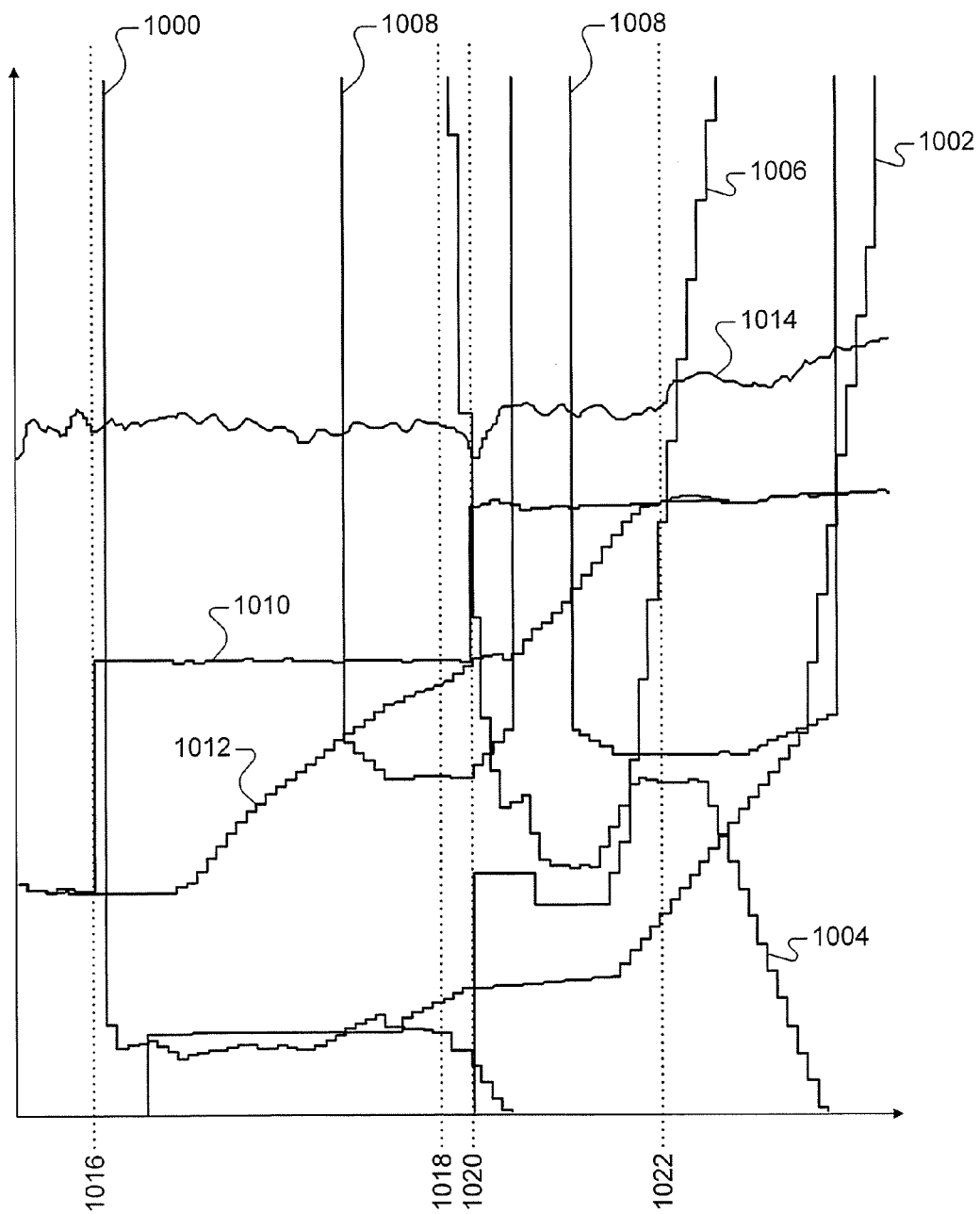

Referring now to FIG. 10, clutch control and sensor signals for a skip-at-sync shift according to principles of the present disclosure are illustrated. As in FIG. 7, a second shift is requested while a first shift is still in progress. However, FIG. 10 shows a skip-at-sync shift executed in response to late step-in. Late step-in refers to a situation in which a driver steps further into an accelerator pedal when a first downshift is almost complete, and the driver's further step-in is interpreted as a request for a second downshift.

Clutch control signal 1000 controls a first off-going clutch of a first (six-to-four) shift. Clutch control signal 1002 controls a first on-coming clutch of the first shift that is transformed into a second holding clutch of a second (four-to-three) shift. Clutch control signal 1004 controls a first holding clutch of the first shift that is transformed into a second off-going clutch of the second shift. Clutch control signal 1006 controls a second on-coming clutch of the second shift. Engine control signal 1008 controls an engine output torque during the two shifts.

A sensor signal 1010 indicates an estimated turbine speed, or a transmission output shaft speed multiplied by a commanded gear ratio. A sensor signal 1012 indicates a measured turbine speed. A sensor signal 1014 indicates vehicle acceleration, or a vehicle speed integrated with respect to time.

At 1016 and 1018, the first shift and the second shift, respectively, are requested. At 1018, the second shift is requested. At 1020, a first sync time occurs when the measured turbine speed is equal to the estimated turbine speed at the commanded gear ratio of the first shift. At 1022, a second sync time occurs when the measured turbine speed is equal to the estimated turbine speed at a commanded gear ratio of the second shift.

At the first and second sync times, the engine output torque may be reduced to achieve a desired or optimum shift feel. As a result, the vehicle acceleration increases steadily during the first shift and during the second shift. This engine torque reduction may be used to improve shift feel in other situations (i.e., use of this engine torque reduction is not limited to late step-in).

For a brief period after 1020, the measured turbine speed remains relatively constant. This indicates that there is minimal delay between the first and second shifts. The minimal delay is due to the late step-in, and is shorter than the delay between the two consecutive conventional shifts shown in FIG. 5. For example, the minimal delay may be between 0 and 200 milliseconds.

In contrast to FIG. 7, the first off-going clutch is gradually and fully released after the first sync time. This prevents the vehicle acceleration from increasing during the minimal delay between the first shift and the second shift when the commanded gear ratio of the first shift is engaged. As a result, a driver perceives the first shift and the second shift as a single shift and shift feel is optimized.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
   a shift stage determination module that determines a duration of a first power-on downshift when a second power-on downshift is requested; and
   a clutch control module that completes the first power-on downshift and that selectively starts controlling the second power-on downshift before the first power-on downshift ends, wherein a power-on downshift is a downshift of a transmission that occurs when an accelerator pedal is depressed.

2. The control system of claim 1, wherein, based on the duration of the first power-on downshift, the clutch control module selectively controls a first off-going clutch of the first power-on downshift at or before a first sync time using a first off-going clutch control pressure that prevents a turbine deceleration, wherein the first sync time is a time when a measured turbine speed is equal to an estimated turbine speed at a commanded gear ratio of the first power-on downshift.

3. The control system of claim 2, wherein, based on the duration of the first power-on downshift, the clutch control module selectively fully releases the first off-going clutch at or before the first sync time.

4. The control system of claim 3, wherein the clutch control module starts releasing a first holding clutch of the first power-on downshift before the first sync time, transforming the first holding clutch into a second off-going clutch of the second power-on downshift.

5. The control system of claim 4, wherein the clutch control module controls the first holding clutch at or before the first sync time using a minimum pressure that prevents clutch slip.

6. The control system of claim 4, wherein the clutch control module starts releasing the first holding clutch before fully applying a second holding clutch of the second power-on downshift.

7. The control system of claim 6, wherein the clutch control module determines an apply rate and timing based on at least one of a desired shift time and a transmission input torque, and the clutch control module applies the second holding clutch using the apply rate and timing.

8. The control system of claim 3, wherein the clutch control module transforms a first on-coming clutch of the first power-on downshift into a second off-going clutch of the second power-on downshift by refraining from fully applying the first on-coming clutch before starting to release the second off-going clutch.

9. The control system of claim 8, wherein the clutch control module controls the first on-coming clutch at or before the first sync time using a minimum pressure that prevents clutch slip.

10. The control system of claim 3, wherein, based on the duration of the first power-on downshift, the clutch control module selectively fully releases the first off-going clutch after the first sync time and after starting to release a second off-going clutch of the second power-on downshift.

11. A method, comprising:
    determining a duration of a first power-on downshift when a second power-on downshift is requested;
    completing the first power-on downshift; and
    selectively starting to control the second power-on downshift before the first power-on downshift ends, wherein a power-on downshift is a downshift of a transmission that occurs when an accelerator pedal is depressed.

12. The method of claim 11, further comprising, based on the duration of the first power-on downshift, selectively controlling a first off-going clutch of the first power-on downshift at or before a first sync time using a first off-going clutch control pressure that prevents a turbine deceleration, wherein the first sync time is a time when a measured turbine speed is equal to an estimated turbine speed at a commanded gear ratio of the first power-on downshift.

13. The method of claim 12, further comprising, based on the duration of the first power-on downshift, selectively fully releasing the first off-going clutch at or before the first sync time.

14. The method of claim 13, further comprising starting to release a first holding clutch of the first power-on downshift before the first sync time, transforming the first holding clutch into a second off-going clutch of the second power-on downshift.

15. The method of claim 14, further comprising controlling the first holding clutch at or before the first sync time using a minimum pressure that prevents clutch slip.

16. The method of claim 14, further comprising starting to release the first holding clutch before fully applying a second holding clutch of the second power-on downshift.

17. The method of claim 16, further comprising:
    determining an apply rate and timing based on at least one of a desired shift time and a transmission input torque; and
    applying the second holding clutch using the apply rate and timing.

18. The method of claim 13, further comprising transforming a first on-coming clutch of the first power-on downshift into a second off-going clutch of the second power-on downshift by refraining from fully applying the first on-coming clutch before starting to release the second off-going clutch.

19. The method of claim 18, further comprising controlling the first on-coming clutch at or before the first sync time using a minimum pressure that prevents clutch slip.

20. The method of claim 13, further comprising, based on the duration of the first power-on downshift, selectively fully releasing the first off-going clutch after the first sync time and after starting to release a second off-going clutch of the second power-on downshift.

* * * * *